United States Patent [19]

Leonard

[11] 4,002,097
[45] Jan. 11, 1977

[54] CHORD PROGRESSION SELECTOR

[76] Inventor: Verna M. Leonard, 8701 N. Highway 41, Fresno, Calif. 93727

[22] Filed: July 10, 1975

[21] Appl. No.: 594,746

[52] U.S. Cl. .................. 84/471 SR; 84/474; 235/88 R
[51] Int. Cl.² .................. G09B 15/02
[58] Field of Search ............ 84/471 SR, 474, 445; 235/88

[56] References Cited

UNITED STATES PATENTS

| | | | |
|---|---|---|---|
| 2,960,267 | 11/1960 | McFarlane | 235/88 |
| 3,129,628 | 4/1964 | Hall | 84/474 |
| 3,472,117 | 10/1969 | Iverson, Jr. et al. | 84/474 |
| 3,592,099 | 7/1971 | Gibby | 84/471 SR |
| 3,884,110 | 5/1975 | Leonard | 84/471 SR |
| 3,884,112 | 5/1975 | Leonard | 84/471 SR |
| 3,884,113 | 5/1975 | Leonard | 84/471 SR |
| 3,884,114 | 5/1975 | Leonard | 84/471 SR |

*Primary Examiner*—Stephen J. Tomsky
*Attorney, Agent, or Firm*—Ralph S. Branscomb

[57] ABSTRACT

A chord inversion coordination aid comprises a plurality of dials of increasing diameter and each representing a particular chord type and having a peripheral array of the scale tone names of the chord in its root and inverted positions arranged in sectors, whereby upon aligning various sectors of the discs a given chord progression can be arranged according to the most easily played chord inversions. The dial may be centrally pivoted behind a cover sheet having a window therein to expose the dial sectors, and a pad of staff paper may be mounted on the cover sheet.

2 Claims, 3 Drawing Figures

CHORD PROGRESSION SELECTOR

BACKGROUND OF THE INVENTION

The invention is in the field of aids for composing musical arrangements and particularly relates to the problem of selecting the inversions of chords in a desired progression which are most easily fingered.

The particular chords and notes used in progressions of various kinds in music can ordinarily be selected from several chords or notes and produce substantially the same musical effect, but some arrangements will be considerably easier to play than others. More particularly, one chord in a musical score may be played in any of its inversions or in the root position and sound about the same, but the difficulty in fingering the next chord in the score may, and usually does, depend on the particular inversion which was used from the prior chord. However, it is difficult even for an experienced composer to recall all of the possible inversion of the numerous chords he may use and even further to select from these inversions those which produce the most easily fingered sequence.

SUMMARY OF THE INVENTION

The present invention provides a solution to the above mentioned difficulties and comprises a plurality of dials, each representing a particular chord type and displaying in a peripheral array the scale tones of the root and inverted positions of that particular chord type, these dials being pivoted together to enable the user to juxtapose the several chord types from the dials and rotate the dials individually until an easily played sequence falls into radial alignment. The dials are radially slit adjacent the scale tone names to permit any one of these tones to be folded back and temporarily removed from view to permit the user to easily visualize chords and sequences in which he wishes one or more tone omitted. Further structure includes a cover sheet having a sector-shaped window therein to frame chord selections on the dials, and a tablet of staff paper mounted on the cover sheet to provide a convenient composition space.

DETAILED DESCRIPTION OF THE PREFERRED EMBODIMENT

Figure 1:
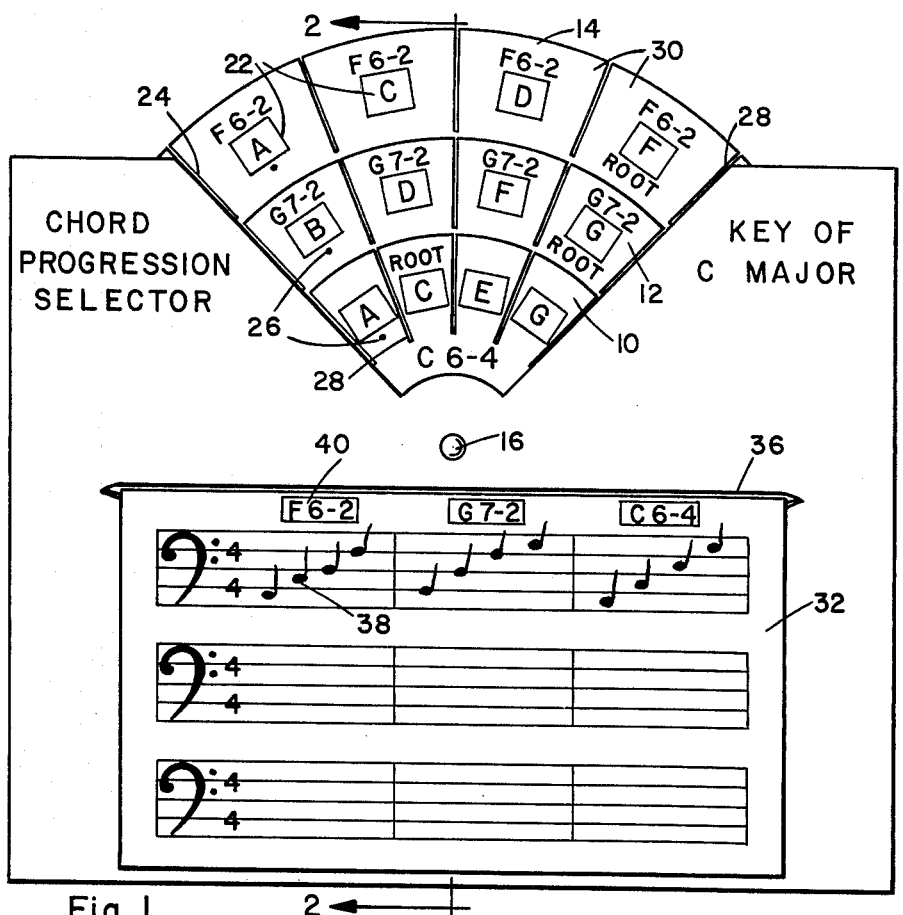
FIG. 1 is a front elevation view of the invention.
Figure 2:
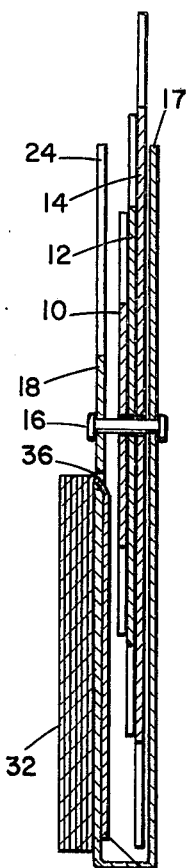
FIG. 2 is a section taken at line 2—2 of FIG. 1.

The invention comprises a plurality of dials which are illustrated as three, numbered 10, 12, and 14 which are centrally connected by a brad 16 which preferably also mounts the dials between a backing sheet 17 and a front cover sheet 18 which are preferably a single sheet of staff paper folded at the bottom. The dials are of increased diameter from the front to the rear so that a peripheral portion of each dial is visible in front of the next forward dial, and these peripheral or marginal portions are each divided into a number of sectors 20, four in the illustrated embodiment. Each dial represents a particular chords type, and the sectors of each dial display the ordered scale tones 22 of the root position and inversions of the particular chord type. For example, in the illustrations the front, middle and rear dials represent the C-6, G-7, and F-6 chords respectively and with reference to dial 14 in FIG. 3, the notation F6-1, F6-2 and so forth identify the dial sectors with the root and consecutively inversions in an alternative nomenclature system.

The cover sheet 18 has a cut out window 24 which frames one sector of each dial, and it can be seen that the scale tones 22 of all three dials are radially aligned when the dials are properly adjusted. In use, the composer works with a pre-arranged chord progression, for example C6, G7, and F6, and by rotating the dials arrives at the combination of root chords and inversions which provide the least difficulty in fingering transition. Since the easiest fingering transition normally occurs when the two chords in question begin on base tones which are close together on the keyboard or identical, the base tones of each sector chord are marked with a red dot 26 or other indicator to identify these tones at a glance. Also, in order that the relative location of the root tone is easily discernable, the word "root" is written beneath the appropriate tones.

The dials could be provided in any number within practical limitations and represent any desired chords, but the three chords selected present a logical combination for the key of C, since they represent the tonic, dominant, and sub-dominant chords in that key, and these chords are ordinarily the backbone of musical composition. Also, more than one of the windows 24 could be used, which would be especially practical for three tone chords.

Figure 3:
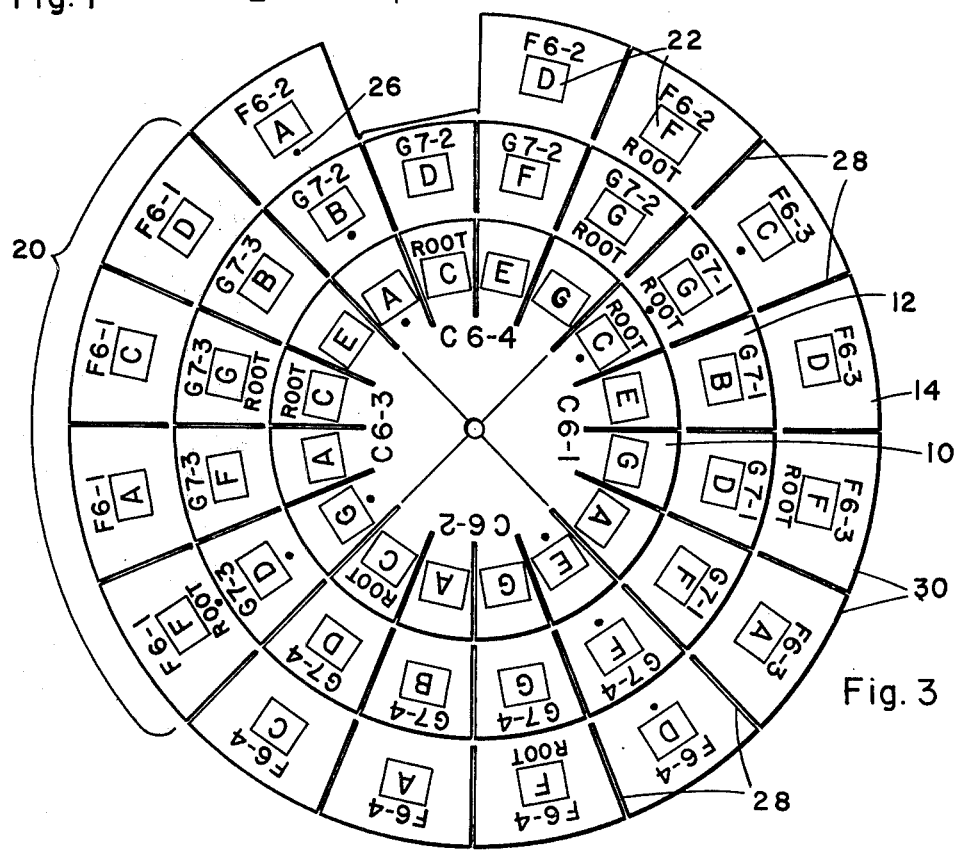
FIG. 3 is a front elevation view of the dials shown removed from the remaining structure.

Often the composer will use some but not all of the scale tones for a particular chord, and to provide a clearer presentation of a partial chord each of the scale tones on the dials is framed by a pair of radial slits 28 to define tabs 30 which can be folded rearwardly out of the way as shown for the C tab on dial 14 in FIG. 3. Other slit arrangements, or even a rotating blind structure, could be used to accomplish the same purpose.

Below the dials a pad 32 of staff paper may be affixed to the sheet 18 to permit the user to compose from the dial without resort to extraneous structure. This pad is bound along the upper margin and has a stiff backing board 34 which is inserted through a slot 36 cut in the front sheet 18 so that the entire pad is replaceable when used up. The staffs are provided in blank and may be inscribed with the notes of the selected chord progression as indicated at 38, and the chord names may also be written at 40.

Thus it can be seen that the device is a complete composing aid, permitting the user to select chords which most easily progress, eliminate certain notes from these chords if desired, and write the composition in note form on the sheets of staff paper.

I claim:

1. An aid for simplifying the selection of chord inversion progressions comprising:
   a. a plurality of dials centrally pivoted together and being of incrementally increased diameter from front to rear, such that each dial has a margin which is visible around the next forward dial;
   b. the visible margin of each dial being divided into a plurality of sectors representing a particular chord type and its inversions and each of said sectors displaying in order the space scale tone names of the chord or inversion named thereon, said sectors being identical in angular dimension and number for all dials and each of said sectors containing the same number of scale tones; and c. each of said dials being composed of a flexible material and having a plurality of radial slits provided in pairs adjacent each of said named scale tones to provide a tab for each scale tone, whereby any selected one of said named scale tones can be removed from view by folding the tab displaying same backward.

2. Structure according to claim 1 and including a cover sheet disposed forward of said dials and to which said dials are pivotally mounted, said sheet having a portion thereof removed to define a window dimensioned to expose at least a portion of any selected sector on any dial by rotating the respective dial; said cover sheet further having a horizontal slot in a lower portion through and including a pad of staff paper having a backing board inserted through said slot, whereby inversion progressions selected from said dials can be inscribed on said staff paper in note form.

* * * * *